United States Patent Office 2,910,481
Patented Oct. 27, 1959

2,910,481

4-SUBSTITUTED 1.2-DIARYL-3.5-DIOXO-PYRAZOLIDINES

Rolf Denss, Rudolf Pfister, and Franz Häfliger, Basel, Switzerland, assignors, by mesne assignments, to Geigy Chemical Corporation, New York, N.Y., a corporation of Delaware No Drawing. Application August 22, 1955
Serial No. 529,935

Claims priority, application Switzerland September 10, 1954

1 Claim. (Cl. 260—310)

The present invention is concerned with therapeutically valuable 1.2-diphenyl - 4 - (3'-hydroxybutyl) - 3.5 - dioxo-pyrazolidine as well as with the salts thereof with inorganic and organic bases and the production thereof. 1.2-diphenyl-4-n-butyl - 3.5 - dioxo - pyrazolidine has attained great importance as a therapeutical agent for the treatment of rheumatic complaints.

It has now been found that the 1.2-diphenyl-4-(3'-hydroxybutyl)-3.5-dioxo-pyrazolidine also has interesting therapeutical properties, in particular, antipyretic, analgesic and antiphlogistic activity.

The new 1.2 - diphenyl-4-(3'-hydroxybutyl)-3.5-dioxo-pyrazolidine is a colourless crystalline substance which easily dissolves both in the usual organic solvents as well as, as enolate ion, in diluted aqueous alkalies as a result of the presence of an acid hydrogen atom. It also easily forms monobasic salts with other inorganic and also organic bases.

The lactone of 1.2-diphenyl-4-(3'-hydroxybutyl)-3.5-dioxo-pyrazolidine can be produced from the latter by reacting it, preferably in a freshly precipitated condition, with dilute acid, in particular with mineral acid. The lactone can also be produced by recrystallising the dioxo-pyrazolidine compound from a suitable organic solvent.

On the other hand, alkali salt solutions of the dioxo-pyrazolidine are obtained from the lactone by dissolving the lactone in an alkaline medium, in particular aqueous or aqueous-alcoholic alkali hydroxide solutions, and the free dioxo-pyrazolidine compound is obtained from the alkali salt solutions by acidification and quick separation of the precipitated substance.

Solutions of salts of the 1.2-diphenyl-4-(3'-hydroxybutyl)-3.5-dioxo-pyrazolidine are the preferred form for parenteral application. Both the dioxo-pyrazolidine and the lactone can be used for oral and rectal application. Thus, on the one hand, the lactone is a well-crystallising, easily purified, stable form which can be stored and used for the preparation of salt solutions of dioxo-pyrazolidine compound and on the other, it can be used for oral and rectal application.

The following example serves to illustrate the production of the new compound. Parts are given as parts by weight and their relationship to parts by volume is as that of grammes to cubic centimetres. The temperatures are given in degrees centigrade.

EXAMPLE 1

(a) *1.2-diphenyl-4-(3'.3'-ethylenedioxy-butyl)3.5-dioxo-pyrazolidine*

274 parts of (3.3-ethylene dioxy-butyl)-malonic acid diethyl ester are dissolved in 100 parts by volume of abs. benzene and 57 parts of sodium ethylate and 184 parts of hydrazobenzene are added. Heat is generated. The reaction mass is boiled for 15 hours under reflux. After cooling, it is poured into water, separated and the aqueous part is washed twice with benzene. The benzene solutions are washed three times with 2 N-sodium carbonate solution and the unified aqueous solutions are acidified with 2 N-hydrochloric acid. The 1.2-diphenyl-4 - (3'.3' - ethylene dioxy - butyl)-3.5-dioxo-pyrazolidine which precipitates can be recrystallised from alcohol. M.P. 165–167°.

(b) *1.2-diphenyl-4-(3'-oxobutyl)-3.5-dioxo-pyrazolidine*

36.6 parts of 1.2-diphenyl-4-(3'.3'-ethylene dioxy-butyl)-3.5-dioxo-pyrazolidine in 750 parts by volume of acetone are boiled under reflux for 18 hours with 0.35 part of p-toluene sulphonic acid. The solution is then filtered, 1500 parts of water are added and the whole is allowed to stand for 24 hours at 5°. The 1.2-diphenyl-4 - (3' - oxobutyl) - 3.5-dioxo-pyrazolidine which precipitates is filtered off under suction and washed with 50% acetone. Melting point from alcohol/water mixture: 115.5–116.5°. Sometimes a crystal form is obtained which melts at 127.5–128.5°.

(c) *1.2-diphenyl-4-(3'-hydroxybutyl)-3.5-dioxo-pyrazolidine*

By reduction with sodium borhydride: 50 parts of 1.2-diphenyl-4-(3'-oxobutyl)-3.5-dioxo-pyrazolidine are dissolved in 1300 parts by volume of methanol and 171 parts by volume of 1 N-caustic soda lye and 250 parts by volume of 10% methanolic sodium borhydride solution are added. This solution is left to stand for 24 hours, care being taken to see that, by water cooling, the temperature does not exceed 40°. The solution is filtered and 2500 parts by volume of 2 N-hydrochloric acid are added. After standing for 48 hours at 5°, it is filtered under suction and the 1.2-diphenyl-4-(3'-hydroxy-butyl)-3.5-dioxo-pyrazolidine is washed with 50% methanol. M.P. from acetone: 163–164°.

Further amounts of the end product can be obtained by shaking the aqueous methanolic mother liquor out with chloroform.

The crystallised compound which melts at 163–164° is the δ-caprolactone-α-carboxylic acid-N.N'-diphenyl hydrazide. It is somewhat difficult to dissolve in alcohol, easier in acetone and more easily still in chloroform. In aqueous or alcoholic-aqueous alkalies it only dissolves in the cold after shaking for some hours. Dissolution can be considerably accelerated by gentle heating. 1.2-diphenyl-4-(3'-hydroxy-butyl)-3.5-dioxo-pyrazolidine is obtained from the alkaline-aqueous solution by quick precipitation with acid which compound melts at 89–91° and dissolves very easily in alcohol and acetone as well as in aqueous alkalies. The compound which melts at 163–164° is again obtained by crystallising from alcohol and acetone.

If the work is performed in the above example in an aqueous instead of in aqueous-methanolic solution, then, on precipitation with 2 N-hydrochloric acid, the dioxo-pyrazolidine compound which melts at 89–91° and easily dissolves in alkalies is obtained immediately. This compound can be converted into the lactone compound which melts at 163–164° by recrystallisation, for example from acetone.

CATALYTIC REDUCTION 5 parts of 1.2-diphenyl-4-(3'-oxobutyl)-3.5-dioxo-pyrazolidine are dissolved in 100 parts of alcohol and 50 parts of 1 N-NaOH and the solution is shaken with 5 parts of nickel catalyst (Raney) at the usual temperature and normal pressure in a $H_2$ atmosphere. After absorption of the calculated amount of $H_2$, the hydrogenation practically comes to a standstill. The catalyst is filtered off and 50 parts of 2 N-hydrochloric acid are added to the filtrate. After standing at 5° for several days, the 1.2 - diphenyl-4-(3'-hydroxy-butyl)-3.5-dioxo-pyrazolidine which precipitates is filtered off under suction and washed with 50% alcohol. The product is identical to that obtained by reduction with $NaBH_4$.

What we claim is:

1.2-diphenyl-4-(3'-hydroxybutyl) - 3.5 - dioxo-pyrazolidine.

References Cited in the file of this patent

FOREIGN PATENTS

| | | | |
|---|---|---|---|
| 506,891 | Belgium | | Nov. 30, 1951 |
| 1,048,710 | France | | Aug. 5, 1953 |